E. R. GILL.
PROCESS FOR MAKING PACKING RINGS.
APPLICATION FILED MAR. 14, 1916.
1,188,370.  Patented June 20, 1916.
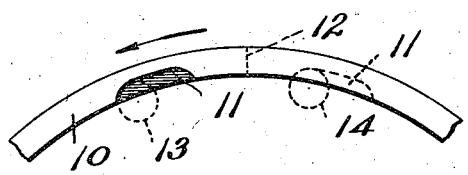
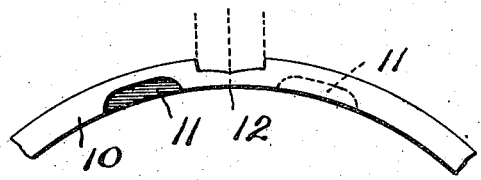
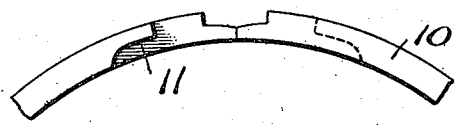
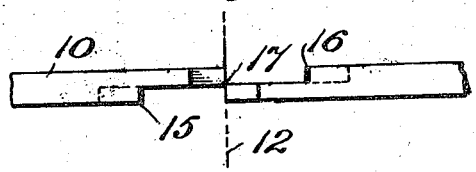
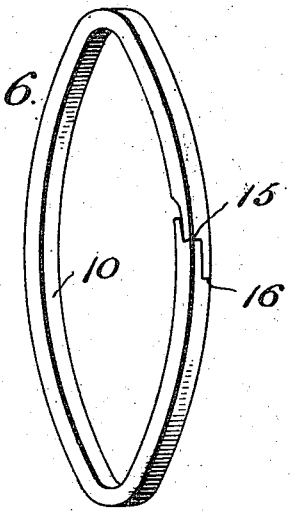
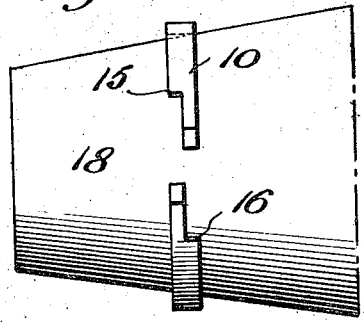
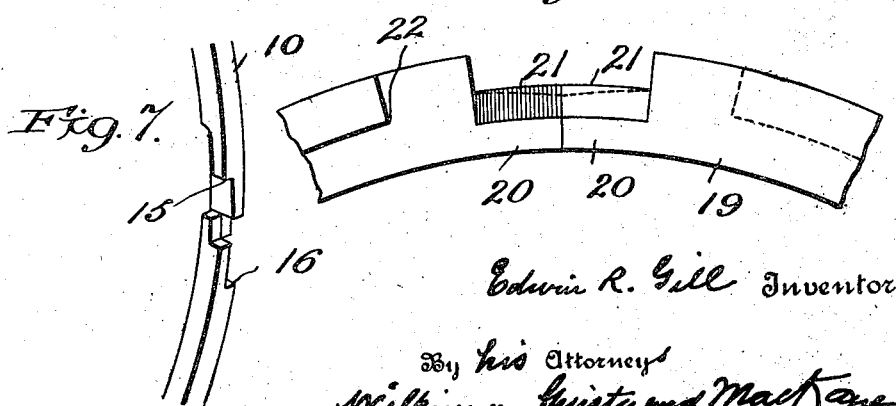
Edwin R. Gill Inventor
By his Attorneys
Wilkinson, Cristie and MacKaye

UNITED STATES PATENT OFFICE.

EDWIN R. GILL, OF YONKERS, NEW YORK.

PROCESS FOR MAKING PACKING-RINGS.

1,188,370.  Specification of Letters Patent.  Patented June 20, 1916.

Application filed March 14, 1916. Serial No. 84,118.

*To all whom it may concern:*

Be it known that I, EDWIN R. GILL, residing at Park Hill, Yonkers, in the State of New York, have invented certain new and useful Improvements in Processes for Making Packing-Rings; and I do hereby declare the following to be a full, clear, and exact description of the invention, such as will enable others skilled in the art to which it appertains to make and use the same.

Packing rings for air compressors, steam engines, high pressure pumps, gas engines, etc., have been made hitherto of more or less resilient metal adapted to be sprung over a piston and into grooves surrounding the piston adapted to accommodate such rings. These rings are counted upon to produce a fluid-tight fit at all times, by reason of their pressing outward so as to hug the inner surface of the cylinder in which the piston moves; and theoretically this tight fit is preserved by the actual expansion of the rings to compensate for wear within the cylinder. In practice, however, the expansion of such rings as have been commercially used is accompanied by an opening of the joint, where the ends of the ring come together, which permits the fluid under pressure to find its way past the ring; either over its outer face, under it and through its containing groove, or by both of these paths. Various plans have been proposed for overcoming this difficulty by making the ring in two or more pieces; but I have found in practice that such devices are not only expensive as compared with one-piece rings, but fail of complete success where subjected to high pressures.

My improved one-piece ring is described and claimed in my pending application filed July 26th, 1915, Serial No. 41871, of which the present application is a continuation to the extent that matter herein set forth is found in said earlier application, and I have described and claimed herein a process of manufacture originally described and claimed in said earlier application, but with certain refinements and improvements not therein set forth.

My improved ring is particularly advantageous in its application to internal combustion engines wherein it is necessary to produce sudden high compression, and then successfully to confine a body of the very hot gases produced by explosion under excessively high pressure. In these engines, too, the proper lubrication of the interior of the cylinder is highly important, while at the same time it is highly desirable for many well known reasons to avoid any excess of lubricating oil being subjected to the interior burning gases. I have found that my improved ring fully meets these requirements of internal combustion engines even when applied to old machines whose cylinders have been deformed by use. Furthermore I have found that fewer rings are required on a given piston when my improved joint is used. This fact conduces to cheapness and to lightness of construction; the latter advantage being important more particularly in engines for aeroplanes and the like.

My improved ring and certain preferred stages in the process of making the same are illustrated in the accompanying drawings, wherein—

Figure 1 shows a portion of the original blank from which the ring is made, as seen from one side after the first double operation is performed upon it, Fig. 2 is a similar view of the same after the second operation, Figs. 3 and 4 are respectively a side view and a plan view of the joints as completed by the third double operation, Fig. 5, illustrates the means for the "fatiguing" or "setting" operation which is next resorted to, Fig. 6 is a perspective view of a completed ring in full closed position, Fig. 7 is a perspective view of the part by open joint, and Fig. 8 shows one practical method for ascertaining the particular curvature upon the upper surface of the underhung projections for a ring of a given size.

In forming my improved ring by my preferred process I first produce (by casting or otherwise) a plain ring 10 of suitable material, which may be good gray cast iron. The circumference of this ring should exceed that desired for the final ring in closed position by an amount equal to the length of one of the projecting "cheek pieces" hereinafter described, including the "underhung projection". The radial thickness should be sufficiently greater than that finally desired to permit of the turning processes described hereinafter.

The preferred first step in the process of manufacture is to produce on the opposite sides of the blank 10, two recesses 11 having curved ends. These recesses are preferably each of a depth equal to one half of the lateral thickness of the blank, and of a height equal to one half the radial thickness of the blank. They are situated symmetrically with respect to the ultimate line of division of the ring, indicated by the dotted line 12. In forming these recesses I prefer to employ two milling wheels simultaneously, these being indicated in dotted lines in their starting positions at 13 and 14. By turning the blank 10 in the direction of the arrow in Fig. 1, these two wheels will form the two cavities at the same time. This "recessing" process may of course be carried out separately for each recess, if desired, instead of simultaneously for the two, or, where simultaneous, the milling wheels may move together as a whole in the same or opposite directions.

The next preferred step in the process is to apply a milling wheel of the contour indicated in dotted lines in Fig. 2 (or two wheels back to back as its equivalent) across the outer cylindrical face of the blank 10. The milling wheel has a median salient which is applied to the dotted line 12, so as to make the reduced portions left under the wheel taper slightly toward the line of ultimate division 12. This tapering is preferably on a curve more fully discussed hereinafter, as is shown exaggerated in the drawings. The depth of the cut made as shown in Fig. 2 should be such as to permit the final fit of the underhung projections within the opposed recesses as shown in Fig. 6. This may be called the cross cutting process.

The preferred third step in the process is illustrated in Figs. 3 and 4, and consists in formation of the "cheek pieces" by milling out the material left on each side in opposite directions from the line 12 to the middle of the arch of each recess 11. The spaces formed by the milling wheels in this process are shown between the line 12 and the respective shoulders 15 and 16 in Fig. 4. Completion of this step in the process causes complete separation at the point 17. The joint as such is now substantially completed. This is the radial milling process.

Before giving the ring its final shape as hereinafter described, I prefer to subject it to a "fatiguing" process whereby the molecular structure is given a preliminary set, for the following reasons: In applying packing rings to the circular recesses prepared for them upon the piston surface, it is customary to place upon the pistons, and across said recesses a number (usually three) of saw blades or similar thin supports over which and the piston the rings are sprung one at a time, being slipped along said supports until each ring reaches its appropriate recess in turn. This operation makes it necessary to open the ring quite widely before compressing it into its recess. I have found that this necessary operation causes the ring to depart materially from the true circular form, usually at a number of points, and this departure, taking the form of a permanent set, causes the ring to press outward against the interior of the cylinder more forcibly at some points that at others, with the result that there is uneven wear and a certain amount of leakage. This phenomenon is made clearly evident upon removing such a ring after actual use, when some parts of the ring are found worn bright, while others are dull, or even blackened by escaping gases. The smaller the ring the more conspicuous is this trouble. I have discovered that this objectionable malformation can be greatly lessened or entirely removed, by giving the molecular structure the expected "set" or "fatiguing" the same before final shaping of the ring. When this is done, and the ring is finally sprung onto the piston, the opening of the ring finds the molecules already accommodated to the requisite strain, and, in consequence, no appreciable malformation will result. In order to produce this accommodation of the ring to its expected use, I prefer to force each ring over a suitable conical mandrel 18, until such ring is opened sufficiently to impart the necessary set to its molecules. Usually the degree of the opening is made slightly greater than that expected in finally adjusting the ring to its piston. This feature of my process is claimed as applied to the manufacture of all forms of piston packing rings. The ring is now compressed into the position shown in Fig. 6, care being taken to press the ends inward so that each underhung extension enters its opposed half recess 11. A blank so produced and compressed is then secured by any well known suitable means, either singly or in a group with other similar rings, and the exterior surface is turned or ground, or both, to the size desired for producing a proper fit in the working cylinder for which it is destined. The interior surface is similarly formed to produce a circle of proper size and related as desired to the external ring.

Considered from the point of view of its fitness to be made by the above described process, the curve left at the closed end of each recess 11 is important, because it makes it possible rapidly to produce the two recesses simultaneously by the two simple milling wheels 13, 14, without any superfluous finishing work.

Considered both from the point of view of the above process and from that of successfully preserving a tight joint against fluid under high pressure, the tapering of the underhung projections is of vital importance.

I have found after many experiments, that rings of the general character described herein cannot be successfully made and used, save to a very limited extent, where the upper surfaces of these underhung projections are formed in the natural and more obvious way; that is to say, are struck upon the arc of a circle concentric with the ring. Under usual conditions, when these parts are so made, they are very apt to break off, either when the blank is compressed into the position shown in Fig. 6, or after a short period of use.

I have found by experiment that where some degree of taper is not given to the underhung extensions, it is generally impossible successfully to compress the ring into position to be turned into shape, after the milling processes above described. This is owing to the fact that, as an effort is made to press an extension on one side under the top of its opposed recess, the corresponding recess on the opposite side is pressed too low to permit its corresponding underhung extension to pass under it. I have found that this difficulty can be avoided by slightly tapering the upper surfaces of these underhung projections, and that the best results as to perfect fit are obtainable by curving these surfaces in accordance with the following theory.

When a ring begins to expand under conditions of wear, the outer portions of the ring are continually supported, guided and formed by the circular contour of the working cylinder. It follows from this that the outer surfaces of the ring, as it expands, conform substantially to a continually expanding circle. In other words, the circular form is constantly maintained by the control of the confining cylinder walls, while the diameter of the circle slowly increases. The underhung projections, however, act as cantaliver and remain—or tend to remain—in their original form, while they slowly change their direction with relation to the tops of the recesses 11. It is this condition or tendency which seems to be responsible for the frequent breakage of these projections when their upper surfaces are struck on a circle. The best curvature to be given to these surfaces to counteract this condition can be ascertained by the following considerations. In practice it is best to select a certain transverse line on the top of each recess 11 which is to be kept constantly in contact with the surface of the corresponding underhung projection, and that is best taken at the extreme edge of the recess. This edge ordinarily coincides with the transverse line at the base of the underhung projection, (where its upper surface meets the shoulder 15 or 16) when the ring is first applied to the piston (see Fig. 6). This line having been selected, it is desirable so to shape the upper surface of the underhung projection that, as the ring opens to take up wear this line or edge on the recess 11 will always preserve close contact with the upper surface of the projection. Remembering that the contact edge selected on the outer contact member (top of recess) expands so as to conform constantly to circles of increasing diameter, while the unconfined inner contact member (the underhung projection) acts as a rigid cantaliver preserving a substantially normal position with relation to the radial shoulder at its base. A formula can be deduced for the curve of the contact surface of the inner member, in which the gradual tapering, or departure of each point from the original circular arc, is expressed in terms of the distance of such point measured along the projection from its base. While these considerations suffice for a mathematical determination of this tapering curve, other practical workshop methods of determining the proper shape may be adopted. One of these is indicated in Fig. 8.

A given size of ring having been chosen, a templet 19 is cut in accordance with the directions above given, save that the tops of the projections 20 (which are of course in separate planes) are cut too low and upon an indifferent curve (for instance concentric with the inner circle) and upon each is built up a layer of suitable adherent yielding material 21 to a height superior to that of the final upper surface of each projection. This material may be of turpentine and wax or some equivalent substance, capable of receiving and retaining a smooth cut. The ring so prepared is then inserted into the wider end of a gradually tapering hollow circular mandrel, and is slowly pressed inward so as to be contracted until closed tightly like the ring shown in Fig. 6. This operation will cause the extreme outer edge 22 of the recess opposing each projection 20 to cut away the yielding material 21 upon a curve approximately indicated in Fig. 8 in dotted lines. This curve will then serve as a perfect guide in the formation of the milling wheel whereby the "cross cutting" process is accomplished. This wheel (or wheels) is shown in Fig. 2 in dotted lines.

It will be seen that my improved joint prevents passage of fluids under pressure across the plane of the ring by reason of the constantly overlapping cheek pieces making close sliding contact on their meeting faces. At the same time penetration of the fluid under the ring is constantly opposed by the contact between each underhung projection and the top of the corresponding recess 11.

In manufacturing my rings above described it is not essential that the steps above described should be carried out in the order which I have described. For instance the operation shown in Fig. 2 may be applied to a number of blanks united, before the operation of Fig. 1.

What I claim is—

1. The process of forming a non-leaking expansible packing ring consisting in carrying out the following steps in suitable order, forming a ring-shaped blank larger than the ring desired, milling out curved ended recesses on opposite faces thereof on opposite sides of a final division line, cross milling a channel on the exterior of said ring the bottom of which slopes slightly on each side down to said line of final division, milling out the metal on each side remaining between said line and radii passing substantially through the middle of each recess, compressing the blank, and shaping the same to conform to a circle of the reduced diameter desired.

2. The process of forming a non-leaking expansible packing ring consisting in carrying out the following steps in suitable order, forming a ring-shaped blank larger than the ring desired, milling out curved ended recesses on opposite faces thereof on opposite sides of a final division line, cross milling a channel on the exterior of said ring the bottom of which slopes slightly on each side down to said line of final division, milling out the metal on each side remaining between said line and radii passing substantially through the middle of each recess, accommodating the molecular condition of the blank to the stretching ultimately necessary in placing it by opening it to a suitable degree, compressing the blank and finally shaping the same while compressed.

3. The process of forming a piston-packing ring which consists in producing a ring-shaped blank larger than the ring desired, shaping the joint, opening the blank to accommodate its molecular condition to the stretching ultimately necessary in placing it, compressing the blank and giving it final shape while under compression.

In testimony whereof, I have affixed my signature.

EDWIN R. GILL.